A. L. SESSIONS.
VEHICLE MOVING TRUCK.
APPLICATION FILED APR. 15, 1913.
1,224,574. Patented May 1, 1917
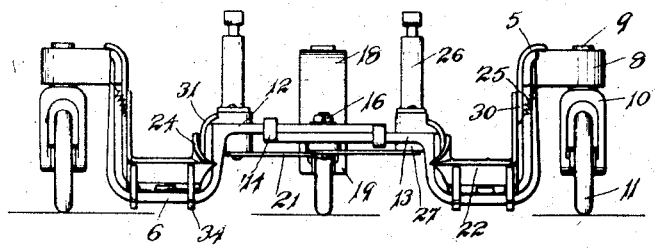
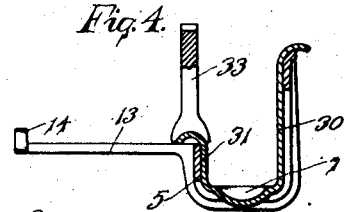
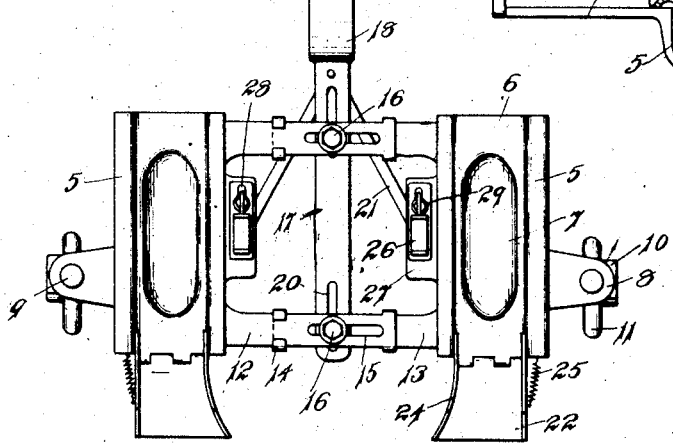
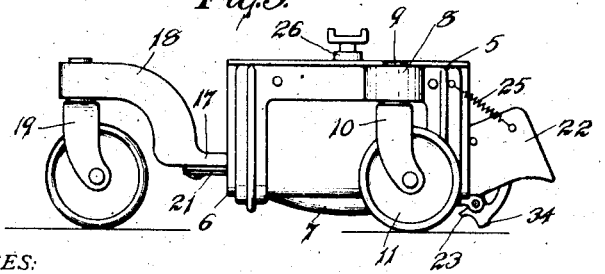
WITNESSES:
E. F. Enton,
Marie E. Meyer.
INVENTOR.
Albert L. Sessions.
BY
Arthur B. Jenkins
ATTORNEY.

UNITED STATES PATENT OFFICE.

ALBERT L. SESSIONS, OF BRISTOL, CONNECTICUT.

VEHICLE-MOVING TRUCK.

1,224,574.　　　　Specification of Letters Patent.　　Patented May 1, 1917.

Application filed April 15, 1913. Serial No. 761,238.

*To all whom it may concern:*

Be it known that I, ALBERT L. SESSIONS, a citizen of the United States, and a resident of Bristol, in the county of Hartford and State of Connecticut, have invented a new and Improved Vehicle-Moving Truck, of which the following is a specification.

My invention relates to the class of devices above named and more especially to a device by means of which one or both of a set of vehicle wheels may be moved without much effort, either vertically or in a horizontal direction, and an object of my invention, among others, is to provide a device of this class that shall be particularly efficient for the purposes in hand.

One form of device embodying my invention and in the construction and use of which the objects above set out, as well as others, may be attained, is illustrated in the accompanying drawings, in which—

Figure 1 is an end view of an apparatus embodying my invention.

Fig. 2 is a top plan view of the same.

Fig. 3 is a view in side elevation of the same.

Fig. 4 is a detail view in cross section through one of the side parts of the frame.

In the accompanying drawing the numerals 5 indicate the side parts of the structure which are preferably separately formed of any suitable material in a manner to provide the required strength, each side part having a vehicle support 6, said supports extending toward each other and having depressions 7 within which the wheels of a vehicle may rest. An arm 8 extends laterally from the upper edge of each support and the shank 9 of a caster frame 10 is rotatably mounted in each arm, each caster frame having a roller support 11 mounted therein in the usual manner. The side parts are united and rigidly held by means of cross bars 12—13 projecting from each of the side parts and adjustably engaging each other, as by means of loops 14 on each cross bar embracing the other cross bar, slots 15 being formed in each of the cross bars to receive bolts 16 by means of which the cross bars are rigidly secured together. It will be noted that this arrangement allows the side parts to be positioned to accommodate the wheels of vehicles of varying widths as to their treads. A stem 17 projects from the frame formed of the side parts and cross bars above described, and this stem has a neck 18 to receive a caster frame 19 and its roller support, the neck 18 extending upwardly as shown in Fig. 3 to locate the shank of the caster frame 19 substantially in the same horizontal plane as that of the caster frames 10. The stem 17 is provided with slots 20 within which the bolts 16 are received, and compensating rods 21 are pivotally attached to the stem 17 and the side parts 5 for the purpose of retaining the stem 17 and the caster frame 19 in a central position longitudinally of the device.

Skids 22 are pivotally attached to each of the side parts, each skid having a supporting strut 23 to underlie the side parts and support them when the skids are in their lowered position to enable automobiles to be run upon the side parts. Each of the skids have flanges 24 converging with respect to each other to direct the movement of a vehicle on to the side parts. Springs 25 may be employed to hold the skids normally in a raised position as shown in Fig. 3 of the drawings.

The side parts hereinabove described include the shelves forming the tread supports for the wheels of a vehicle and also the side parts rising therefrom to the upper edge of which the arms 8 are secured, this construction being for the purpose of enabling a large roller support to be employed so that the truck may be easily moved.

Jacks 26 are mounted on the tread supports, as herein shown projections 27 extending from the tread supports or shelves and upon which the jacks rest. These jacks are adjustable along the projections while being retained thereon, as herein shown slots 28 in the base of each jack receiving a bolt secured to and extending from the projection and receiving a clamp nut 29 by means of which the jacks are adjustably secured in position.

While I have shown and described herein a preferred construction embodying my invention this may be departed from to a greater or lesser extent and yet embody the invention which is therefore not limited to the exact construction herein shown and described.

It will be seen from an examination of Fig. 4 that my improved truck embodies a construction in which the tires of a vehicle may securely rest, the depression 7 being curved laterally to conform to the general cross sectional shape of the tread of a tire. The longer flange 30 and the shorter flange 31 of the side parts of the frame are curved at their upper edge, as shown in Fig. 4, to avoid injury to a vehicle, and this overturned edge may also afford a rest as for a strut 33 which may be placed upon the edge, as shown in Fig. 4, to support the vehicle with its weight removed from the tire.

It will be understood that the supporting struts 23 are so formed that when moved under the truck the weight of the automobile on the frame pressing the struts against a floor will hold them in this position, the rest 34 being pressed against the floor and the strut 23 against the under side of the support 6.

I claim—

1. A truck including a frame supported by a pair of rollers located one at each side thereof, said frame comprising tread supports spaced apart between said rollers to receive the wheels at opposite ends of an axle of a vehicle, said tread supports having outer side parts rising therefrom, roller supporting frames for said rollers journaled in the upper edges of said side parts, and connections between said tread supports located below the upper edges of the outer side parts to a degree to underlie the under part of a vehicle.

2. A truck including a frame supported by a pair of rollers located one at each side thereof, said frame comprising tread supports located between said rollers at opposite side edges of said frame to receive the wheels of a vehicle, said tread supports having side parts rising therefrom at the outer sides thereof and spaced apart to receive both wheels on the axle of a vehicle between them, and roller supporting frames for said rollers journaled in the upper edges of said side parts.

3. A truck including a frame supported by a pair of rollers located one at each side thereof, said frame comprising tread supports located at opposite sides thereof and between said rollers to receive the wheels of a vehicle and having side parts rising therefrom at the outer sides thereof and spaced apart to receive both wheels on the axle of a vehicle between them, roller supporting frames for said rollers mounted in said frame and rising above the tread supports, and skids pivotally secured to the tread supports, and roller supports to sustain said frame.

4. A truck including a frame supported by a pair of rollers located one at each side thereof, said frame comprising side parts vertically arranged and spaced apart and between said rollers to receive both wheels on the axle of a vehicle between them, a connection between the lower edges of said side parts constituting the floor upon which both wheels on an axle of a vehicle rest, and roller supporting frames journaled in bearings at the upper ends of said side parts.

5. A truck including a frame supported by a pair of rollers located one at each side thereof, said frame comprising tread supports located between said rollers to receive the wheels of a vehicle, said tread supports including side parts rising therefrom, roller supporting frames for said rollers mounted in said frame and rising above the tread supports, and a guide support also mounted in the frame at one end thereof and rising above said tread supports, and roller supports to sustain said frame.

6. A truck including a frame supported by a pair of rollers located one at each side thereof, said frame comprising tread supports located at opposite sides thereof and between said rollers to receive the wheels of a vehicle, said tread supports including side parts rising therefrom and constituting said tread supports as shelves, supports for said rollers mounted in said frame and rising above said tread supports, and a guide roller mounted in the frame, and roller supports to sustain said frame at one end thereof and on a line passing between said tread supports.

7. A truck including a frame supported by a pair of rollers located one at each side thereof, said frame comprising tread supports having side parts located between said rollers and rising from said supports and constituting said supports as shelves to receive the wheels of a vehicle, roller supporting frames for said rollers journaled in said frame and rising above said tread supports, a single guide support journaled in said frame at one end thereof and rising above said tread supports, and roller supports to sustain said frame and a roller mounted in said guide support.

8. A truck including a frame supported by a pair of rollers located one at each side thereof, said frame comprising tread supports located between said rollers and forming a part of said frame and including side parts rising above the tread supports, said side parts being arranged to receive a support to sustain the weight of a vehicle independently of the tread supports, and roller supporting frames for said rollers journaled in the truck frame.

9. A truck including a frame supported by a pair of rollers located one at each side thereof, said frame comprising a tread support forming a part of said frame, means upon the truck frame and located between said rollers for receiving and supporting the weight of a vehicle independently of the tread supports, and roller supporting frames for said rollers journaled in the sides of the truck frame.

10. A truck including a frame supported by a pair of rollers located one at each side thereof, said frame comprising a tread support located between said rollers and forming a part of said frame and including side parts rising above the tread support, means upon the frame for receiving and supporting the weight of a vehicle independently of the tread supports, and roller supporting frames for said rollers journaled at the side of said truck frame.

11. A truck including a frame supported by a pair of rollers located one at each side thereof, said frame comprising tread supports located between said rollers and forming a part of said frame, skids pivotally attached to said tread supports and having flanges converging with respect to each other to guide wheels on to said tread supports, and roller supporting frames for said rollers secured to the frame to movably support it, and roller supports to sustain said frame.

12. A truck including a frame with tread supports forming a part thereof, roller supports on each side of said frame, and a member having a neck arching upwardly from one end of the frame and with a roller support secured thereto.

13. A truck including a frame with tread supports forming a part thereof, means for adjusting said supports laterally of the frame, clamping means for holding said parts against movement one with respect to the other, roller supports for said tread supports, a member adjustable lengthwise of the frame and held by the clamps above mentioned, and a roller support secured to said member.

14. A truck including a frame with side parts rising from opposite edges thereof and spaced apart a distance sufficient to receive both wheels on the axle of a vehicle between them, roller frames pivotally secured to the upper edge of said side parts, rollers journaled in said frames, a bar projecting from the central part of the truck at one end thereof and arching upwardly and having a horizontal portion located substantially level with the upper part of the side parts of the truck, a roller bearing frame journaled in said horizontal portion, and a roller journaled in said frame.

15. A truck including a frame with tread supports forming a part thereof, bars projecting laterally from each tread support and overlapping each other, each bar having means extending around its companion bar, means for securing the bars together, and rollers journaled at the outer sides of the tread supports.

16. A truck including a frame with tread supports forming a part thereof, bars projecting from each end of said tread supports toward each other, each bar having members surrounding its companion bar, means for securing said bars together, a stem supported by said securing means, roller bearing frames and rollers journaled in said tread supports, and a roller bearing frame and bearing journaled in said stem.

17. A truck including a frame with tread supports forming the sides thereof, bars extending from the sides of each tread support at each end thereof and toward each other, said bars each having means to surround its companion bar, means for securing said bars together, a stem projecting laterally across said bars and supported by said securing means, a neck arching upwardly from said stem, roller bearing frames and rollers journaled in said supports, and a roller bearing frame and roller journaled in said neck.

ALBERT L. SESSIONS.

Witnesses:
ARTHUR B. JENKINS,
E. A. EATON.